(No Model.)
T. PATTON.
ATTACHMENT FOR BROKEN AXLES.
No. 374,200. Patented Dec. 6, 1887.
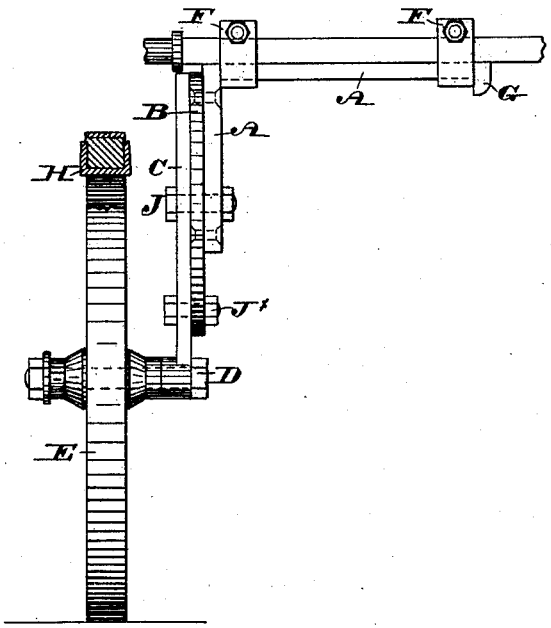
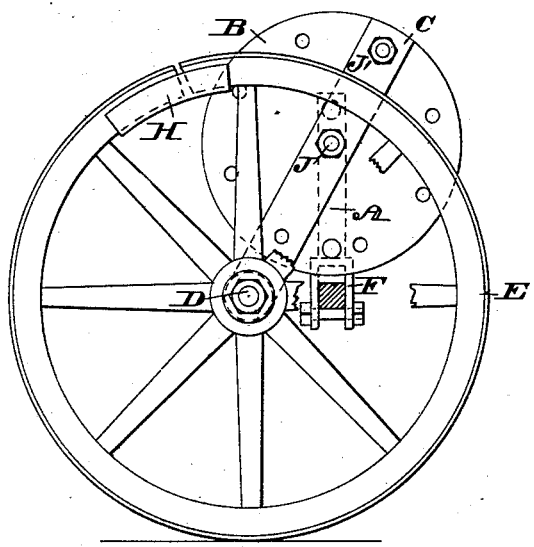
WITNESSES:
Th. Rollé.
Jas. F. Kelly
INVENTOR:
Thomas Patton
BY John A. Wiedersheim
ATTORNEY
N. PETERS, Photo-Lithographer, Washington, D. C.

UNITED STATES PATENT OFFICE.

THOMAS PATTON, OF PHILADELPHIA, PENNSYLVANIA.

ATTACHMENT FOR BROKEN AXLES.

SPECIFICATION forming part of Letters Patent No. 374,200, dated December 6, 1887.

Application filed May 10, 1887. Serial No. 237,705. (No model.)

*To all whom it may concern:*

Be it known that I, THOMAS PATTON, a citizen of the United States, residing in the city and county of Philadelphia, State of Pennsylvania, have invented a new and useful Improvement in Devices for Repairing Axles and Wheels, which improvement is fully set forth in the following specification and accompanying drawings.

My invention consists of devices for repairing broken axles and wheels, as will be hereinafter fully set forth.

Figures 1 and 2 represent side elevations, at a right angle to each other, of devices for repairing broken axles and wheels embodying my invention.

Similar letters of reference indicate corresponding parts in the two figures.

Referring to the drawings, A represents a bar, and B represents a perforated plate which is secured to the end of said bar, forming together an angular piece.

To the plate B is pivoted by a pin or bolt, J, the perforated arm C, whose lower end has a temporary bolt or journal, D, which is passed through the hub of the wheel E, and secured thereto by a nut or other means, such as a pin inserted in the end of the bolt opposite to the head thereof, as shown in dotted lines.

F represents clips, which are employed for connecting the bar A with the axle, said bar having a shoulder, G, on its inner end for preventing lateral displacement of the bar.

H represents clamps, which are applied to and embrace the inner circumferences of adjacent fellies of the wheel E when the latter is broken or weakened or its tire is displaced, said clamps being secured to the fellies in any suitable manner; or they may be dovetailed in cross-section and be driven over the fellies, so as to tightly clasp and thus splice the fellies.

The bar and other parts may be carried with a vehicle, so as to be within convenient reach.

The operation is as follows: When an axle is broken, the wheel is removed and the bar A secured to the parts of the axle by the clips F, whereby the axle is spliced. In order to adjust the height of the bar A to the diameter of the wheel E, the arm C is rotated on the plate B, the two parts acting as a crank, whereby the bar is raised or lowered, as required, and a pin or bolt, J', is then passed through coincident openings in the bar and plate, so as to connect the same. The vehicle may now be run temporarily on the wheel sufficient for all purposes until repairs are made.

Having thus described my invention, what I claim as new, and desire to secure by Letters Patent, is—

A device of the character named, consisting of a bar attachable to an axle, a perforate plate connected with said bar, a perforated arm pivoted to said plate, a bolt or journal at the lower end of said arm, and a fastening bolt or pin passed through the perforations of said pivoted arm and plate, said parts being combined substantially as described.

THOMAS PATTON.

Witnesses:
JOHN A. WIEDERSHEIM,
A. P. JENNINGS.